United States Patent [19]

Hoffman et al.

[11] 3,766,316

[45] Oct. 16, 1973

[54] FRAME SYNCHRONIZATION DETECTOR

[75] Inventors: Eric J. Hoffman, Ellicott City; James A. Perschy, Laurel; Benjamin M. Elder, Silver Spring, all of Md.

[73] Assignee: The United States of America as represented by the Secretary of the Navy, Washington, D.C.

[22] Filed: May 3, 1972

[21] Appl. No.: 249,836

[52] U.S. Cl. ......... 178/69.5 R, 340/146.1 D, 328/37

[51] Int. Cl. ............................................. H04l 7/00

[58] Field of Search ................................ 178/89.5 R; 179/15 BS; 340/146.1 D; 325/58; 328/48, 63, 37, 72

[56] References Cited

UNITED STATES PATENTS

| | | | |
|---|---|---|---|
| 3,648,237 | 3/1972 | Frey | 178/69.5 R |
| 3,586,776 | 6/1971 | Salava | 178/69.5 R |
| 3,562,710 | 2/1971 | Halleck | 340/146.1 D |
| 3,701,894 | 10/1972 | Lon | 178/69.5 R |
| 3,594,502 | 7/1971 | Clark | 178/69.5 R |
| 2,700,696 | 1/1955 | Barker | 325/38 A |

OTHER PUBLICATIONS

"Information Theory and Reliable Communication," Robert Gallager, 1968, pgs. 245–252.

*Primary Examiner*—Benedict V. Safourek
*Assistant Examiner*—A. M. Psitos
*Attorney*—R. S. Sciascia et al.

[57] ABSTRACT

Long strings of digital data are preceded by a frame sync pattern or "Barker" word. The Barker word is fixed and known to the receiver and the appearance of the Barker word enables the receiver to mark the beginning of a frame. The difficulty of detection of the sync pattern is compounded when the data has a bit error rate and when the sync word is transmitted amidst random data. Detecting the frame sync pattern is a problem of cross-correlation of the data stream with a stored replica of the Barker word sync pattern. This device is a detector for accurate frame sync detection using a minimum quantity of hardware and significantly simplifying frame sync pattern detectors.

13 Claims, 3 Drawing Figures

FRAME SYNCHRONIZATION DETECTOR

DESCRIPTION OF THE PRIOR ART

In a data stream wherein data bits are transmitted according to a prearranged sequence, it is essential the receiver be capable of detecting the start of each data frame and the position of each data bit in that frame. This is typically accomplished by transmitting a frame sync pattern which the receiver recognizes and which enables it to detect the start of each successive data bit frame. The difficulty of detection of the frame sync pattern is compounded in telemetry where a bit error rate is experienced and where the frame sync pattern is transmitted along with random data.

The standard and most often used process for detecting the frame sync pattern has been to correlate the frame sync pattern with a replica. Implementation of this pattern has involved complex detection circuits and as a minimum has required a shift register stage or flip flop for each data bit in a frame sync pattern. Such an arrangement is a distinct disadvantage in applications requiring light weight and low power such as satellites and airborne communications. This invention is capable of detecting a Barker word frame sync pattern transmitted in a sequence of random data, utilizing a minimum quantity of electronic components and overcoming cost and weight problems.

The basic component to this detector is a shift register. The shift register has a maximum number of stages equal to n where the number of sequential bits in the Barker word is $(2^n-1)$. If the number of bits in the Barker word is such that its log to the base two is not an integer, then the number of stages in the shift register is at a maximum equal to the next highest integer.

A feedback loop comprising an exclusive "or" gate is connected between the last stage of the shift register and the first stage and to an intermediate stage of the shift register. The Barker word replica is sequentially produced at the last stage of the shift register. The output of the last stage is connected to a comparing means (which may be an exclusive or gate) which compares the output of the shift register within any data bit time interval and the corresponding data bit appearing in that bit time interval. A mismatch produces a signal which triggers a reset mechanism to reset the shift register to its initial state wherein the data bit in the last stage of the shift register corresponds to the first data bit in the Barker word.

When a Barker word is transmitted and a match occurs between the data bit in the last stage of the shift register and the Barker word bit in the incoming data stream, the feedback loop responsive to the states of the intermediate and last stages of the shift register steps the shift register causing the next sequential Barker word bit to appear in the last shift register stage.

As each Barker word replica bit sequentially appears in the last stage of the shift register and is matched to the data stream Barker word bit occurring in the replica data bit's corresponding time interval, the shift register is sequentially stepped to produce the next sequential Barker word bit in its last stage. When a match occurs between the last bit of the Barker word replica and the last bit of the Barker word in the incoming data stream, the shift register will register a predetermined binary state. A sensor connected to each of the shift register stages generates a signal responsive to this state indicating that a frame sync Barker word pattern has been detected.

Variations of this detector employ a second sensor connected to the shift register to detect the first m-bits of the $(2^n-1)$bits long Barker word plus the total number of $(2^n-1)$ bits in the Barker word. This variation enables the detector to increase in reliability proportional to the number of additional Barker word bits added to the Barker sequence. Additional reliability can be added to the detector by adding a string of digital zeros to the Barker sequence with the number of zeros being greater than the maximum number of consecutive zeros appearing in the Barker word. This will assure that a mismatch will occur before the Barker word is reached and the shift register will be placed in its initial state, thereby reducing error probability and increasing the detector's reliability. The Barker can be similarly expanded by adding zeros or adding on portions of the Barker word to the Barker word sequence and including sensors to detect the appearance of the added on sync sequences, thereby improving the detector's reliability.

The result achieved by this device is a Barker word detector wherein the shift register generating the Barker replica and a state corresponding Barker word recognition is kept to a minimum number of stages or flip flop components.

Heretofore, the number of stages in the shift register were equal to the number of bits in the Barker word. As disclosed, Barker word recognition may now be achieved using a minimum number of shift register stages equal to $n$, wherein $(2^n-1)$ is the number of bits in the Barker word. Hardware requirements are substantially reduced without incurring the penalty of poor autocorrelation characteristics in the detector.

DESCRIPTION OF THE INVENTION

Figure 1:
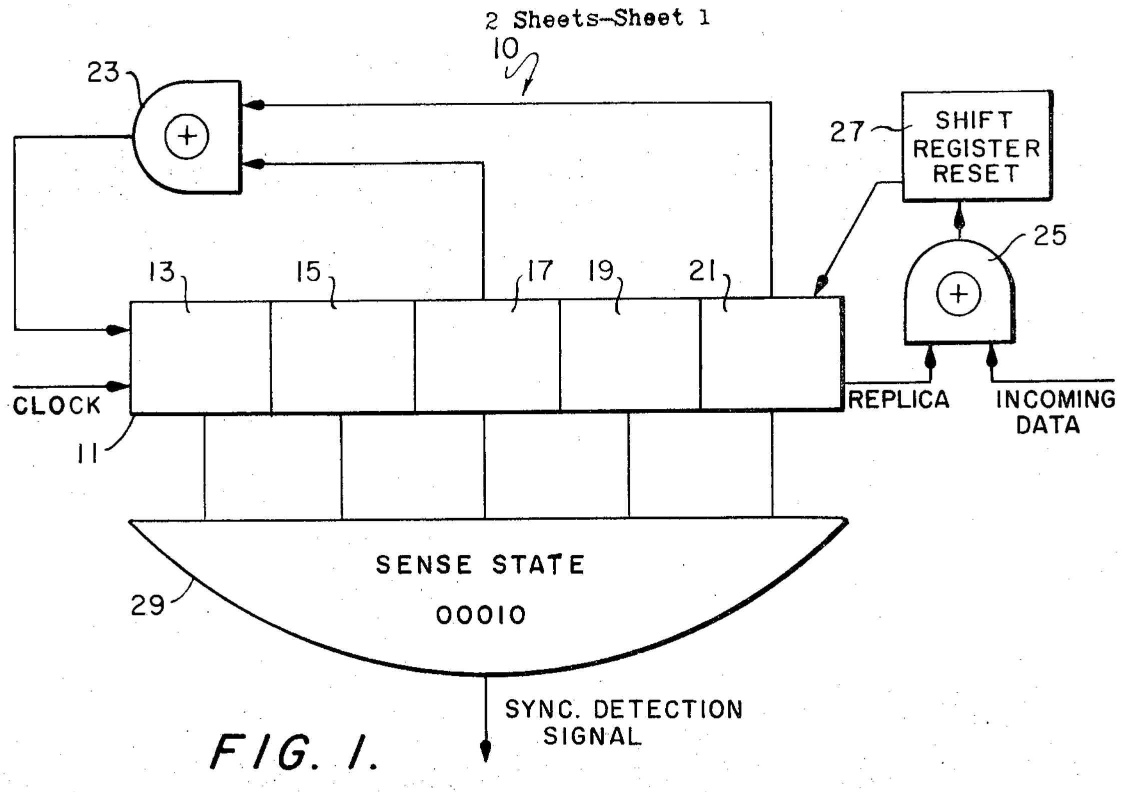
FIG. 1 is a sync detector employing a five stage feedback detector for detecting a 31 bit Barker word sequence ($n = 5$, $2^n-1 = 31$)

A maximal length linear feedback shift register sequence is a bit pattern of $2^n-1$ bits formed by connecting an n bit shift register to feed back a function of its stages to stage number one on each shift. Simultaneously, all other bits are shifted to the right in the adjacent stages and the bit in the last stage is discarded. Such a maximal length linear feedback shift register 11 is shown in FIG. 1 within the detector designated generally by numeral 10. The shift register 11 has five stages, 13, 15, 17, 19 and 21, with 21 being the rightmost or last stage. The feedback logic consists of an exclusive or gate 23 having its inputs connected to the last stage 21 and intermediate stage 17 with the case of the five stage shift register of FIG. 1. The output of the exclusive or gate 23 is connected to the first stage 13 and with each successive clock pulse, the first stage 13 is updated with the preceding state of the exclusive or gate 23 and the state of each stage is shifted to the right.

When the feedback logic is properly selected, the maximum length linear feedback shift register produces a $2^n-1$ bit sequence at its last stage or output stage. This $2^n-1$ bit sequence is the Barker word replica which is compared with the data input.

Where n is equal to 5, as in the case of the 5 stage register shown in FIG. 1, the Barker word sequence is a $2^5-1 = 31$ bit sequence and starts with 1 and with the shift register initially loaded with data group 00001. The sequence of bits sequentially produced in the last stage is the 31 bit sequence Barker replica:

1000010010110011111000110111010

An exclusive or gate 25 has an input connected to the last stage of the shift register 11 for receiving the replica bit and a second input connected to the incoming data stream. A match between the data input and a replica bit will produce a binary 0 at the output of exclusive or 25 while a mismatch will produce 1 causing shift register reset 27 to reset the shift register back to its initial state or data group 00001. In the event of a mismatch, the shift register is thereby returned to its initial state with the replica bit matching the first bit in the Barker word. It is then held ready for the next matching bit in the incoming data stream.

With the shift register 11 in its initial state (00001) the arrival of the first Barker bit will result in a match. Upon the next successive clock pulse, all states in the shift register are shifted to the right with the state of the last shift register stage 21 disappearing. The first stage 13 will now have the state of the exclusive or gate 23 immediately preceding the clock pulse. Exclusive or gate 25 will again compare the state of the shift register stage 21 with the incoming data and reset the shift register to its initial state (00001) if a mismatch occurs or will continue to signify a match by holding its output at 0 so shift register reset 27 is not triggered and each stage of the shift register is shifted to the right, updating the first stage 13 of the shift register with the state of gate 23 immediately preeding the updating clock pulse.

Where the incoming data stream is the Barker word, the 31 bit $(2^n-1)$ Barker word sequence will be sequentially generated within stage 21 of shift register 11. The state of each stage in the shift register and each of the data groups produced by the shift register will then correspond to a particular bit in the Barker word sequence and to a specific clock pulse in the stream of clock pulses and to a particular bit time.

When the last Barker word bit, being the 31st bit, is recognized, the shift register state and data group will be 00010. Sensor 29 connected to each of the stages of shift register 11 senses the appearance of data group 00010 signifying a successive and consecutive number of matches between the replica bits from shift register stage 21 with each successive Barker word bit in the incoming data stream and signals that sync detection has occurred.

Reliability is increased as the Barker word bit sequence is increased. By properly choosing shift register feedback loop logic, a maximal shift register is obtained which yields the longest data group sequence without a repeat. A system using a three stage shift register would therefore be less reliable than a five stage shift register shown in FIG. 1. Such a three stage shift register shown in FIG. 2 with the shift register 31 having stages 32, 34, and 36. An exclusive or gate 33 has its inputs connected to the first stage 32 and the last stage 36 of shift register 31 and the output of the exclusive or 33 is connected to the first stage 32 of the shift register. A second exclusive or is connected to the Barker replica sequentially generated at the last stage 36 of the shift register and to the incoming data stream.

A shift register reset 37 is connected to the shift register 31 and resets shift register 31 to state or data group 001 when a mismatch occurs between a replica and the incoming data stream, causing a 1 to be generated at exclusive or 39 and causing said shift register reset 37 to reset the shift register 31.

The feedback logic is selected to produce a maximal length linear feedback shift register sequence of 7 bits $(2^n-1;\ n = 3)$ and 7 non-repetitive data groups. The shift register is initially set to data group 001 by shift register reset 37 responsive to a mismatch in the inputs to exclusive or gate 39. As shown in Table I, the Barker word replica is generated in sequence starting with clock pulse 0 and ending with clock pulse 6.

TABLE I

| Clock | 32 | 34 | 36 |
|---|---|---|---|
| 0 | 0 | 0 | 1 |
| 1 | 1 | 0 | 0 |
| 2 | 1 | 1 | 0 |
| 3 | 1 | 1 | 1 |
| 4 | 0 | 1 | 1 |
| 5 | 1 | 0 | 1 |
| 6 | 0 | 1 | 0 |
| 7 | 0 | 0 | 1 |

Figure 2:
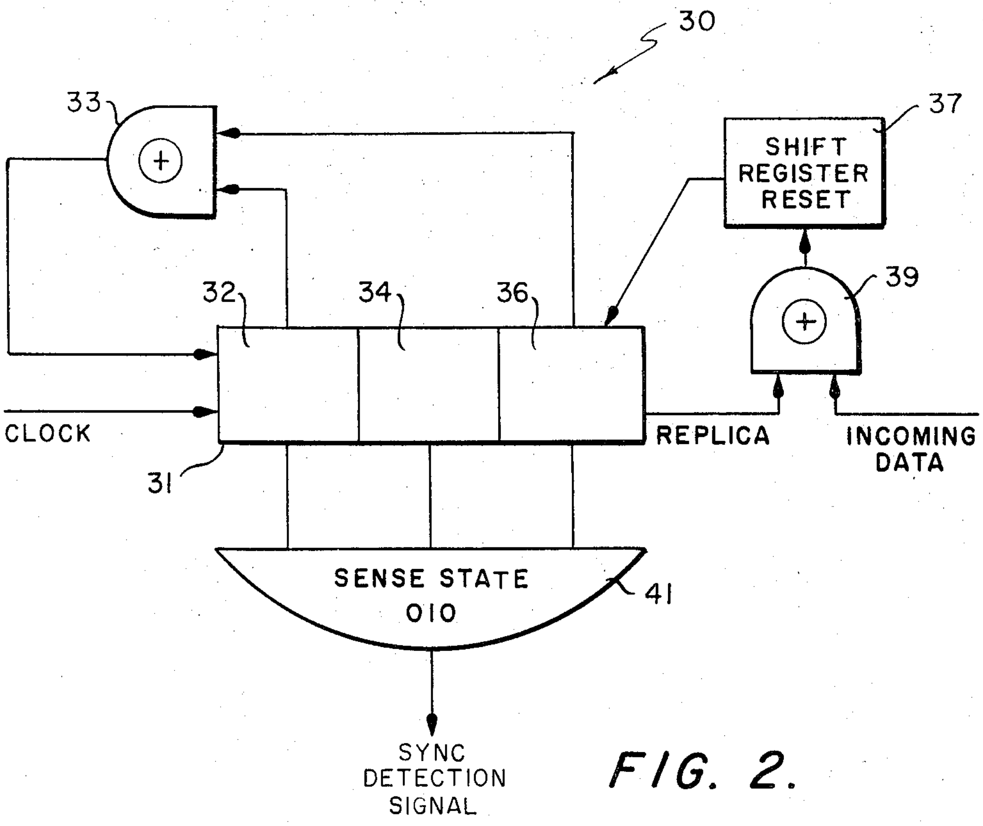
FIG. 2 is the sync detector of FIG. 1 with a three stage shift register for detecting a 7 bit Barker word ($n = 3$, $2^n-1 = 7$)

The shift register will change states or data groups in sequence corresponding to clock pulses sequence 0–6. Sensor 41 will then sense a Barker word match corresponding to state or data group 010 at clock pulse 6, signifying the detection of a frame sync pattern. Had the incoming pattern disagreed at any time, with the Barker replica sequentially generated within stage 36 of shift register 31, exclusive or gate 39 would generate a 1, signalling shift register reset 37 to reset shift register 31 to its initial state or data group 001.

Where *n* is 5 and the Barker word sequence is 31 bits long $(2^n-1)$, the Barker word can be detected with a minimum number of shift register stages equal to 5. This results in a saving of $31 - 5 = 26$ shift register stages. In the device of FIG. 2 utilizing a three stage shift register Barker word detector with $2^n = 8$ and the Barker word sequence having 7 bits $(2^n-1)$ and 7 nonrepeating data groups, a saving of $7 - 3 = 4$ shift register stages is obtained.

Reliability may be increased leaving less chance for error in detecting the Barker word sequence by recognizing that a Barker word sequence of $2^n-1$ bits has one longest run of zeros exactly $n-1$ bits long. If the $2^n-1$ bit Barker sequence is preceded by *n* zeros, we are assured that one of the data stream zeros must disagree with the Barker replica forcing the register to state 1 (00001) and keeping it there until the first Barker bit arrives immediately following the nth zero. This involves no change to hardware, only a pre-sync pattern of *n* zeros and an initial state selected so that the first Barker bit is a 1.

Reliability may be increased even further by utilizing the concept of a parity bit. For example, each data stream may consist of 17 bit words comprising 16 data bits plus a parity bit. If the first 17 bits of the Barker sync pattern has an even number of 1's (even parity), we may precede this 31 bit Barker word by a repeat of its first 17 bits and select odd parity for the 17 bit coded data group. It is impossible for the elongated Barker, formed by the Barker word preceded by the first 17 bits of the Barker word ($m = 17$), to appear anywhere in the data stream. This is true because any 17 bit group in the new $17+31=48$ bit Barker word, starting at any bit from 1 to 17 must have even parity. Therefore, the first 34 bits of the 48 bit Barker cannot appear in the data, and therefore the Barker word cannot appear in the data. The elongated Barker word would now appear as shown below

| first $m$ bits of Barker word | $2^n-1$ bit Barker sequence |
|---|---|

where m = the bit length of the coded data word $$m < 2^n - 1$$

Figure 3:
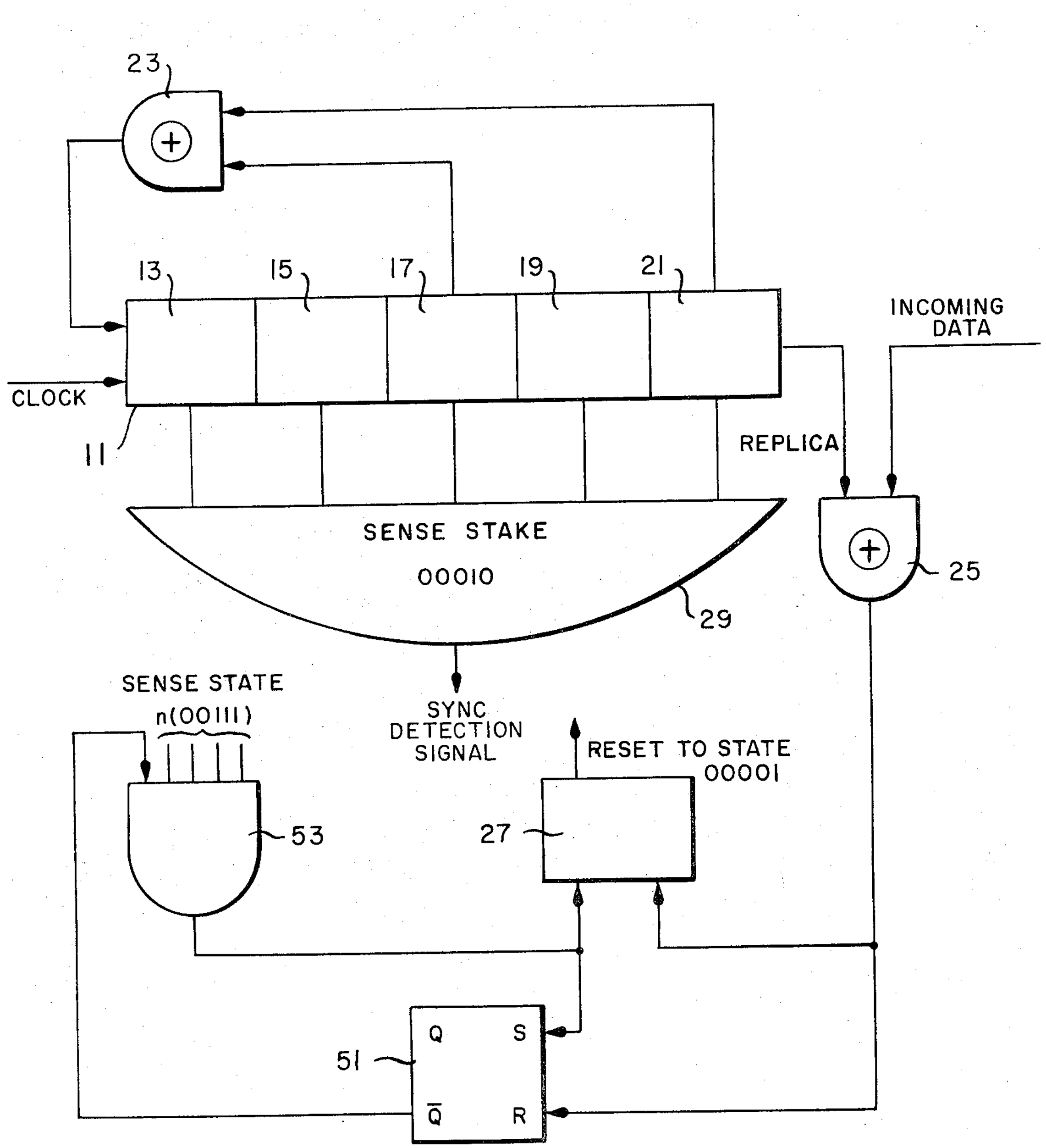
FIG. 3 is the Barker word detector of FIG. 1 with an additional detection loop connected to the shift register for detecting an elongated Barker word comprising the 31 bit Barker word preceded by the first 17 ($m = 17$) bits of the 31 bit Barker word.

A detector for recognizing the elongated Barker word would now appear as shown in FIG. 3 which is the system as shown in FIG. 1 with the same numbers designating the same parts and with the additional elements added for recognizing the elongated Barker. These additional elements include set-reset flip-flop 51 and sensor 53. Recognition of the first 17 bits in the elongated Barker word will step shift register 11 to its 17th state or data group (00111). The $\overline{Q}$ output of set-reset flip flop 51 responsive to the last reset signal from exclusive or gate 25 is 1 to the input of sensor 53. Upon reaching the 17th state, sensor 53, triggered by its combined inputs of $\overline{Q} = 1$ and sense state 17, will trigger the reset 27 to reset the shift register to its initial state or data group 00001. Whereupon the remaining 31 bits of the replica Barker sequence will be generated within the last stage 21 of the shift register 11.

Additionally, the elongated Barker may be preceded by a number of zeros equal to $n$ to increase the Barker recognition reliability.

The result of this frame sync system is that the hardware increases proportional to log to the base 2 of the number of Barker word bits rather than directly with the number of Barker word bits. The true Barker is always accepted and the Barker pattern presents good autocorrelation properties.

When the elongated Barker word scheme is used with single parity coded data, the results are (a) a detector requiring only one additional flip flop more than the absolute minimum required, (b) fairly good autocorrelation characteristics are produced, and (c) the detector always accepts the true Barker and rejects the false Barker, and a method is provided for preventing the accidental occurrence of Barker in the data frame.

What is claimed is:

1. A system of detecting a frame sync pattern in a stream of random digital data, comprising:

a first means for serially producing data groups;

said first means being a shift register having a maximum capacity of $n$ bits or the next largest integer, where $n$ is not an integer;

a second means for sequentially comparing the last positioned bit of each said data group with the incoming data stream bit appearing in the same bit time frame as said last positioned bit;

said data groups appearing in a predetermined sequence and each signifying the number of consecutive matches in digital states between said last positioned bit of each group and said data stream bits;

third means connected to said shift register for signalling the detection of a frame sync pattern in response to said shift register producing a data group corresponding to a number ($2^n-1$) of consecutive matches;

where the maximum number of bits in each group is equal to $n$, or the next higher integer where $n$ is not an integer, and where $2^n-1$ is the number of bits in each frame sync pattern; and wherein said shift register's initial state is a data group having said last positioned digit matching said first bit in said frame sync pattern; and including means to reset said shift register to its initial state in response to a mismatch in the data state between said last positioned bit and said incoming data bit.

2. The system of claim 1 wherein:

said shift register is a maximal length linear feedback shift register.

3. The system of claim 1, wherein:

said feedback shift register includes a feedback loop having a first input connected from said shift register last stage to receive said last bit and a second input connected to an intermediate stage in said register for receiving said intermediate bits;

said feedback loop output being connected to said first stage of said shift register; and said feedback loop being connected to said shift register stages to produce a maximal length shift register sequence.

4. The system of claim 3, wherein:

fourth means connected to said shift register for signalling the detection of a portion of said sync pattern in response to said shift register producing a data group corresponding to $m$ consecutive matches between said data stream and said last bit of each set, where $m < 2^n-1$;

said resetting means resetting said shift register to its initial state in response to said signal from said fourth means;

means for inhibiting said fourth means after said fourth means signals the detection of said portion of said sync pattern for enabling said shift register to sequentially change state in said predetermined sequence until a mismatch occurs or a frame sync pattern is indicated.

5. A system for locating a frame sync Barker word pattern in a stream of random digital data comprising:

a Barker word having $2^n-1$ bits in a predetermined sequential order;

means for sequentially generating a replica of each said Barker word bit;

said means being a shift register having a maximum number of stages equal to $n$ or the next highest integer where $n$ is not an integer;

means for comparing said shift register generated replica bit with said incoming data stream;

means connected between said comparing means and said shift register for resetting said shift register to its initial state in response to a mismatch between said incoming data stream and said Barker word replica;

means for indicating a Barker word in said incoming data stream when said shift register state corresponds to $2^n-1$ consecutive matches between said Barker replica and said Barker word pattern in said incoming data stream.

6. The system of claim 5, wherein:

said shift register is a maximal length linear feedback shift register for generating a $2^n-1$ bit Barker word sequence;

said shift register having a feedback loop connecting said output stage of said shift register and an intermediate stage of said shift register to the first stage of said shift register for causing said shift register to change in its state responsive to the states of said output and intermediate stages for sequentially producing said Barker word bit sequence at its output.

7. The system of claim 6 wherein said replica is produced at the last stage of said shift register and said last stage is said output stage.

8. The system of claim 7 wherein said feedback loop includes a first exclusive or gate having a first input connected to said shift register last stage and a second input connected to said shift register intermediate stage and having its output connected to the first stage of said shift register.

9. The system of claim 8, wherein:

said means for comparing is an exclusive or gate having a first input connected to said shift register last stage and a second input connected to said incoming data stream.

10. The system of claim 9, wherein:

the said Barker word is 1001110;

$n = 3$;

said shift register is a 3 stage shift register;

said feedback loop is connected between said first and third stages of said shift register and the first stage of said shift register; and said state of said shift register corresponding to a match between said incoming data stream and said sequentially generated Barker word comprising $2^n-1$ bits is 010.

11. The system of claim 9, wherein:

said Barker word is 1000010010110011111000110111010;

$n = 5$;

said shift register is a 5 stage shift register;

said feedback loop being connected between said last stage and said middle or third stage and the first stage; and said state of said shift register corresponding to a match between said Barker word replica and said incoming data stream is 00010.

12. The system of claim 11, wherein:

an elongated Barker replica comprises said $2^n-1$ bits long Barker sequence preceded by the first *m* bits of said $2^n-1$ bit long Barker sequence;

means for sensing a match between said first *m* bits of said elongated replica and said incoming data stream;

resetting means connected to said means for sensing a match for resetting said shift register to its initial state responsive to said match; and means responsive to said match for inhibiting said means for sensing a match between said first *m* bits of the elongated Barker replica and the incoming data stream to enable said shift register to sequentially and consecutively generate the Barker word comprising $2^n-1$ bits without resetting said shift register to its initial state in response to a match sensed between the first *m* bits of said Barker replica and the corresponding *m* data bits in the incoming data stream.

13. The system of claim 12, wherein said elongated Barker word is preceded by *n* zeros.

* * * * *